UNITED STATES PATENT OFFICE.

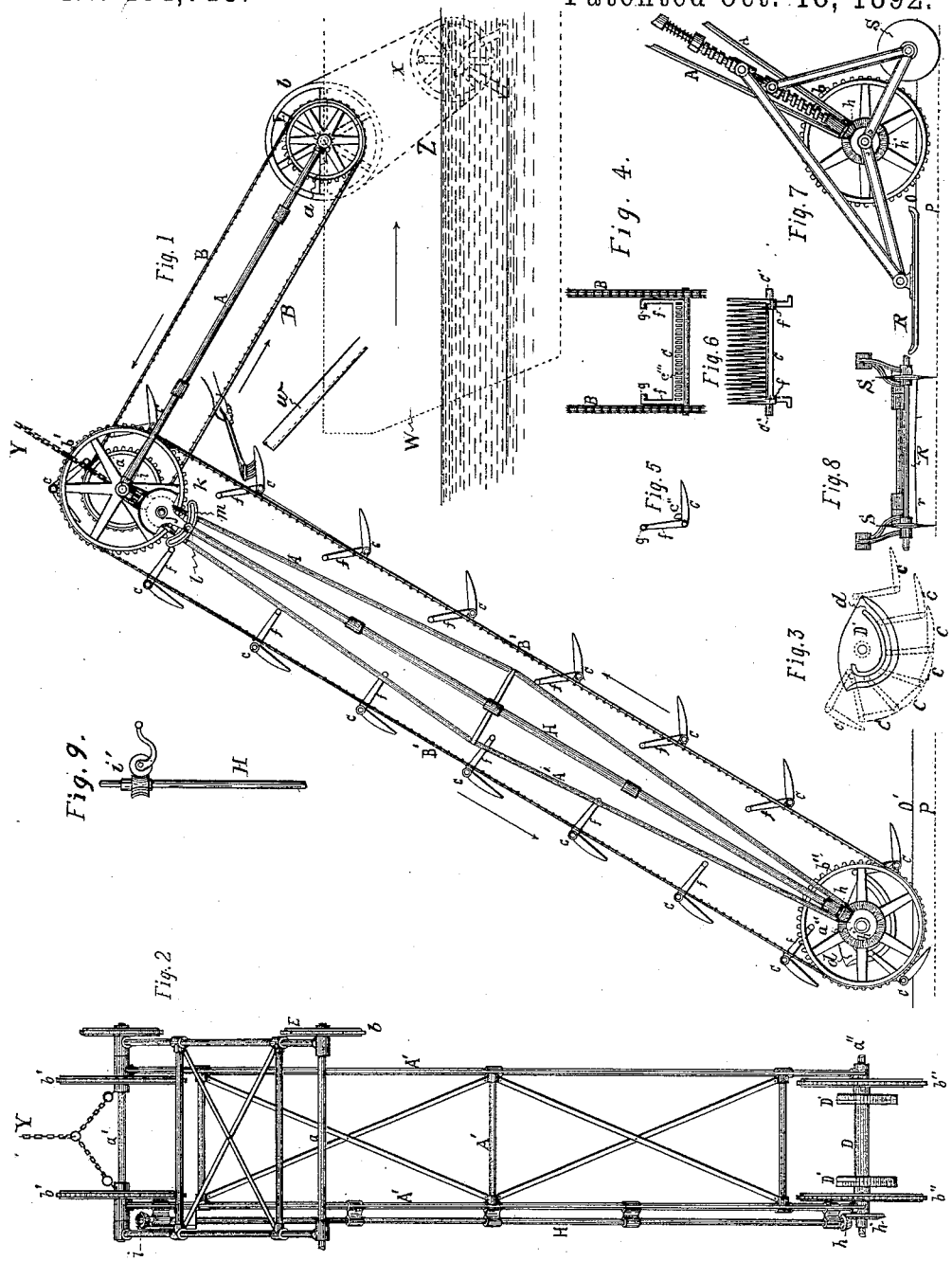

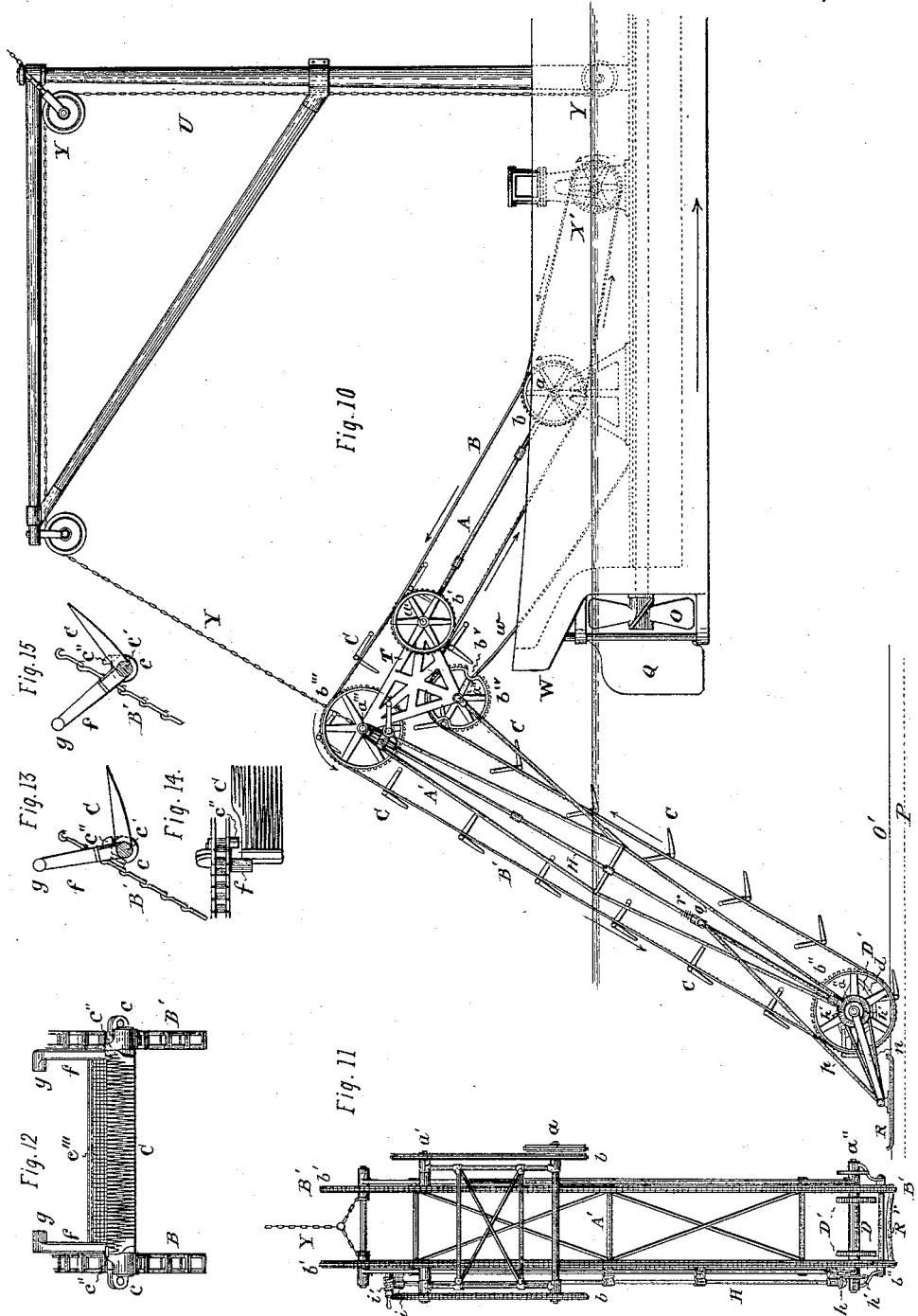

HENRY R. HILTON, OF JERSEY CITY, NEW JERSEY, AND JAMES E. WILSON, OF NEW YORK, N. Y.

CLAM OR OYSTER RAKE OR DREDGE.

SPECIFICATION forming part of Letters Patent No. 484,715, dated October 18, 1892.

Application filed August 1, 1891. Serial No. 401,437. (No model.)

*To all whom it may concern:*

Be it known that we, HENRY R. HILTON, of Jersey City, county of Hudson, State of New Jersey, and JAMES E. WILSON, of New York, county and State of New York, citizens of the United States, have jointly invented a new and useful Clam or Oyster Rake or Dredge, of which the following is a specification.

Our invention belongs to the class of dredging and excavating devices which employ a series of rakes or scoops attached to one or more endless chains which are stretched around sprocket-wheels rotated by any suitable power.

Our invention relates to a provision to enable the gathering and raising from ocean-beds or water bottoms of any substances lying thereupon or embedded therein, the provision being more particularly intended for the gathering of clams and oysters.

Our invention can also be utilized for scarifying or "cultivating" such bed-surface preparatory to the planting of oysters or other shell-fish therein.

Referring to the accompanying drawings, which form a part of this specification, Figure 1 is a side elevation of an apparatus embodying a simple form of our invention. Fig. 2 is a front elevation of the same, the endless chains and their attached rakes being omitted. Fig. 3 is an inside view of one of the rake-deflecting cams. Fig. 4 is a front view of one of the rakes and portions of the carrying-chains. Fig. 5 is a side view of a rake-tooth. Fig. 6 is a top view of the same. Fig. 7 is a side view showing foot and colter attachments. Fig. 8 is a front view of said colter and foot. Fig. 9 represents a modification of the cam adjusting and locking mechanism. Fig. 10 shows by side elevation a form of our dredge slightly differing from that shown in Fig. 1. Fig. 11 is a front elevation of the "boot" of such dredge, omitting the rakes. Fig. 12 is a top view of a rake. Fig. 13 is an inner side view of one of the rakes in its socket, together with a portion of one of the endless chains. Fig. 14 is a top view of the same. Fig. 15 represents the rake in an up-tipped position.

W may represent a scow or other water-craft.

A A' is the frame of the machine, shown as constructed of ordinary water-piping, braced with rods, and supporting at its ends and at an intermediate point shafts $a\ a'\ a''$, the last-named preferably non-rotative. On this shaft the revolving parts are sleeved. The intermediate shaft $a'$ also serves as the axis of a hinge, for the purposes hereinafter explained.

$b\ b'\ b''$ are sprocket-wheels.

B B' are endless chains or belts, of which the chains B' carry a series of forwardly pointing or directed rakes, scoops, or combs C by means of sockets or ears $c$, attached to the links of said chain. These sockets constitute bearings for the rake-trunnions $c'$.

$c'''$ represents a grated back, which while permitting escape of mud and water serves to retain the oysters or other matter which it is desired to elevate.

Sleeved upon shaft $a''$ are side cams D', connected by the sleeve D. The office of these cams is to control the position to be assumed by the rakes while passing around the lower sprocket-wheels $b''$, being drawn by the endless chain to which they are journaled.

By reference to Figs. 4, 5, 6, 13, 14, and 15 it will be seen that the trunnions $c'$ form the axes about which each rake is at liberty to vibrate upward in said sockets, but is prevented from depression below a horizontal position in its loaded and ascending condition by stops or lugs $c''$ on the sockets against which the rake-arms $f$ are brought to rest. In order to secure the desired vibration, each rake has two arms $f$, that terminate with inwardly-extending lugs $g$, which occupy eccentric grooves $d$ in the cams D', and thus serve to direct the rake-points so as first to secure the proper penetration of the sea-bed and then to emerge from the bed in the horizontal position best adapted to retain and carry up the load or "take" thus collected. (See Figs. 1 and 3.)

To enable the person in charge to adjust the cams D' for a greater or less rake penetration while the boot is submerged, we provide the following means: H is a shaft supported in bearings in the plane of shafts $a'$ $a''$ and carrying at its lower end bevel-pinion $h$, which engages with bevel-gear $h'$, which is rigidly attached to the shaft $a''$, carrying sleeve D. The shaft H carries at its upper end a like bevel-pinion $i$, which engages in a cogged segment $j$, that can be made fast to the frame by means of an arm $k$, which carries a nutted bolt $l$, that traverses a slotted plate $m$ upon the frame.

The shaft $a$ and its attached sprocket-wheels $b$ are driven by any suitable means—such as chain or belt connection Z—either with a hand-winch X, Fig. 1, or with a steam-engine X', Fig. 10, which may be the engine which is employed to propel the scow W through the instrumentality of any suitable propeller O, the scow being kept head-on by a rudder Q.

In the form above described the contents of the rakes may be removed by an instrument in the hands of an attendant, as shown in Fig. 1.

The above-described form or type of our invention is susceptible of various modifications. For example, there may (see Fig. 10) be a forward extension T of the frame which carries the shaft $a''$ that does duty as the hinge between the two main parts of the frame. Associated with this are two additional shafts $a'''$ $a^{IV}$, which carry "idle" sprocket-wheels $b'''$ $b^{IV}$. Indentations $b^V$ in the periphery of the sprocket-wheel $b^{IV}$ permit the passage of the rake-sockets in the manner shown. By this arrangement the rake-chains as they reach the point of discharge are deflected forward and downward, as shown in Fig. 10, so as to dump or discharge the take onto a suitable chute $w$, which conducts the matters into the scow. A crane U, furnished with suitable tackle Y, enables the person in charge to suspend the machine at any desired height and position. In some cases an adjustable foot or drag R (having, preferably, the transversely-concave sole $r$) may be employed to limit the penetration of the rakes. Both foot and a colter, to be hereinafter described, may be attached to and adjusted simultaneously with the gearing $h'$, as shown in Fig. 7, or, as shown in Fig. 10, said foot may depend from an arm $n$, that vibrates loosely about shaft $a''$ and be forced and held downward by a rod $p$, whose upper end bears against a nut $q$ on a screw $r$ upon the shaft H.

S, Fig. 7, shows a colter, also adjustable, which may be associated with such foot.

$i'$, Fig. 9, shows a worm movement for use instead of the parts $i\ j\ k\ l\ m$.

The operation of the machine is as follows: It being placed in position as shown in Fig. 1, the lower or boot end resting upon the surface of water bottom, sufficient weight having attached to it to resist the thrust of the rakes, the upper or boat end being attached to a suitable frame on said boat or float, the outboard or hinged portion being supported by suitable rigging Y, power is applied by means of a hand-winch, a steam-engine crank-shaft, or any other convenient rotary motion to sprocket-wheel E, thence via endless chain or belt B in the direction indicated by arrows, and through shaft $a'$ to the endless chain or belts B', carrying rakes or combs $c\ c$, &c. As the rakes approach cams D' D' the lugs $g$ $g$ enter the cam-grooves, thus converging or diverging the points, as may be most desirable. Straight line O' represents the bed-surface, upon which the boot rests. Dotted lines P represent the depth below said surface to which it is desired the rake-teeth shall penetrate. Should it be desirable to thrust the blades or teeth of the rakes to a greater or less distance below the surface, it is accomplished by adjustment of cams D' D', as explained above. The position of the cam-grooves in relation to the center of rotation of the rakes is such that the rake-teeth assume nearly a horizontal position as they pass the lower center and remain in that position through the remainder of their revolution about the sprocket-wheels $b''$. Said teeth are thus caused to penetrate the ground, and by remaining in such relative position whatever they may have gathered is elevated and delivered above the surface of the water. Clams lie a few inches under the surface; oysters on the surface; roots of vegetables penetrate below the surface. Much refuse is often on the surface, and by the means of the adjustment above described the take of the rakes is at all times under the control of the operator. A forward movement of the float, as indicated by arrow, carries forward the machine, which, being weighted at the bottom, will always preserve about the same relative position. It being hinged, rise or fall of the tide, waves, or greater or less depth of water within certain limits is provided for. The main frame may be made extensible and by lengthening or shortening the same, as well as the chains or belts, as great range of depths may be provided for as desirable.

For use on mud bottom when the boot end would be liable to sink too deep it is proposed to attach a shoe or foot R to the frame extending to the rear of the boot, which, dragging on the bed and covering a large surface, shall prevent deeper penetration than is desired. It may be found desirable in some cases to also attach to the lower end of the frame suitable blades, preferably in the form of revolving disks or colters S, which shall be extended ahead of the general movement of the machine to cut the ground to depth being worked, the same as is used on turf-plows. The said shoe R and colters S are preferably arranged and connected to the foot-frame in the manner shown in Figs. 7 and 8 or as in Figs. 10 and 11.

Having thus described our invention, the following is what we claim as new therein and desire to secure by Letters Patent:

1. The combination, with a self-propelled scow, of a rotary submarine rake or dredge having the frames, substantially as shown and described, with endless chains armed with tines which engage the water bed in the direction of travel of the scow, constructed and operated substantially as set forth.

2. The combination of the hinged frame A A' with a rotary dredge or elevator in which the positions of the buckets, rakes, or combs are controlled by the cam or cams D within the boot of same, substantially as described.

3. In a rotary dredge or elevator, the combination of the hinged frame A A', the endless elevator having teeth adjustable in pitch or angular presentation with the adjustable cam or cams, substantially as described.

4. In a rotary dredge or elevator, the combination, with a scow, of the hinged frame A A', the endless chain or belts B, armed with tines, rakes, or combs $c$ $c$, pointed in direction of travel of the scow, and the adjustable cam or cams D', substantially as described.

5. In a rotary dredge or elevator, the combination of hinged frame A A', endless chain or belts B, the forwardly-directed rakes or combs $c$, cam or cams D' D', operating-gears $h$ and $h'$, shaft H, pinion $i$, and segment $j$, substantially for the purpose as described.

6. In a submarine dredge or elevator, the combination of the frame A A', endless chain or belt B, and forwardly-directed rakes, teeth, or combs $c$, with the arms $f$ and the stops $c''$, substantially as described.

7. In a submarine dredge or rake, the combination of the frame A A' and the endless revolving chains armed with tines, with the foot or drag attached to the lower end of the frame, for the purposes set forth.

8. In a submarine dredge or rake, the combination, with a scow, of the frame A A', rotatable endless chains armed with tines, and the cutting disks or colters, substantially as described.

9. In a submarine dredge, the combination, with a supporting and dragging scow provided with frame A A' and belt B, of the boot or outer hinged frame having the forward and downward projection T, in combination with the rake-bearing chains B', the driving sprocket-wheel $b'$, and the "idlers" $b'''$ $b$.

10. In a submarine dredge having the supporting and dragging scow, the combination of the frame A A', the belt B, the endless elevator B', having forwardly-directed teeth or tines C, shaft $a''$, loosely-vibrating arm $n$, rod $p$, nut $q$, and screw-threaded shaft H $r$.

11. In an oyster-dredge, the combination of the frame A A', belt B, endless chains B', having the forwardly-directed teeth or tines C, the attached sockets $c$, having stops or lugs $c''$, and the vibratable rakes C, having arms $f$.

12. In combination with the oyster-dredge, substantially as hereinbefore shown, the boot, and the foot R, having transversely-concave sole $r$.

HENRY R. HILTON.
      JAMES E. WILSON.

Witnesses:
 GEO. H. KNIGHT,
 HARRY E. KNIGHT.